United States Patent
Kennemer et al.

(10) Patent No.: US 9,394,017 B2
(45) Date of Patent: Jul. 19, 2016

(54) CART WITH FOLDING SUPPORT

(71) Applicant: Tractor Supply Company, Brentwood, TN (US)

(72) Inventors: Brian Kennemer, Brentwood, TN (US); Ty Rager, Hendersonville, TN (US)

(73) Assignee: Tractor Supply Company, Brentwood, TN (US)

( * ) Notice: Subject to any disclaimer, the term of this patent is extended or adjusted under 35 U.S.C. 154(b) by 12 days.

(21) Appl. No.: 14/549,597

(22) Filed: Nov. 21, 2014

(65) Prior Publication Data

US 2016/0144909 A1    May 26, 2016

(51) Int. Cl.
*B62D 63/06* (2006.01)
*B60D 1/145* (2006.01)
*B62D 33/033* (2006.01)
*B62D 63/08* (2006.01)
*B60D 1/00* (2006.01)

(52) U.S. Cl.
CPC ............ *B62D 63/061* (2013.01); *B62D 33/033* (2013.01); *B62D 63/062* (2013.01); *B62D 63/08* (2013.01); *B60D 1/145* (2013.01); *B60D 2001/005* (2013.01)

(58) Field of Classification Search
CPC .... B62D 63/061; B62D 63/08; B62D 63/062; B62D 1/145; B62D 33/033; B62D 2001/005; B62B 2206/00; B62B 2206/006; B62B 2206/06; B60D 1/145; B60D 2001/005
See application file for complete search history.

(56) References Cited

U.S. PATENT DOCUMENTS

| | | | |
|---|---|---|---|
| 2,416,492 A * | 2/1947 | Neeley | B62B 1/18 280/47.3 |
| 2,765,193 A * | 10/1956 | McGrew | B60P 1/06 298/20 R |
| 2,870,928 A * | 1/1959 | Haggard | B60P 1/6445 414/447 |
| 2,918,296 A * | 12/1959 | Goodale | B62B 5/0023 280/47.3 |
| 2,992,011 A * | 7/1961 | Becan | A01G 1/12 280/47.26 |
| 3,054,622 A * | 9/1962 | Davis | A45C 13/385 280/1 |
| 3,494,667 A * | 2/1970 | Schlapman | B60P 1/04 280/47.26 |
| 3,575,439 A * | 4/1971 | Lusk | B60K 25/08 280/47.3 |
| 3,860,254 A * | 1/1975 | Wegener | B62B 1/208 280/652 |
| 4,274,644 A | 6/1981 | Taylor | |
| 4,353,596 A * | 10/1982 | Gibson | B62B 1/12 206/223 |
| 4,417,765 A | 11/1983 | Wirsbinski | |

(Continued)

OTHER PUBLICATIONS

Precision Owner's Manual LC1503BT Dump Cart, 4 pp. (Apr. 2010).

(Continued)

*Primary Examiner* — Joseph Rocca
*Assistant Examiner* — Maurice Williams
(74) *Attorney, Agent, or Firm* — Lucian Wayne Beavers; Patterson Intellectual Property Law, PC (57) ABSTRACT

A cart may comprise a body, an axle having an axis of rotation, at least one wheel, a forward support, and a rear support. The forward support may include a forward support hinged end, and a forward support free end, the forward support hingedly connected to the body at the forward support hinged end to pivot about a forward support axis. The rear support may include a rear support hinged end, and a rear support free end, the rear support hingedly connected to the body at the rear support hinged end to pivot about a rear support axis. The forward support free end may be configured to selectively connect to the rear support at the rear support free end by the axle to rotatably support the wheel, and the axis of rotation of the axle may be parallel to each of the forward support axis and the rear support axis.

22 Claims, 8 Drawing Sheets

(56) References Cited

U.S. PATENT DOCUMENTS

| | | | | |
|---|---|---|---|---|
| 4,711,499 A | * | 12/1987 | Fortin | B62D 63/062 298/17 R |
| 4,822,065 A | | 4/1989 | Enders | |
| 4,836,610 A | * | 6/1989 | Doering | A01D 43/07 298/17 B |
| 5,028,060 A | | 7/1991 | Martin | |
| 5,242,189 A | * | 9/1993 | Osaki | B62B 1/26 280/47.24 |
| 5,395,163 A | * | 3/1995 | Mandell | B62D 63/062 298/2 |
| 5,687,978 A | | 11/1997 | Rhodes et al. | |
| 5,782,490 A | * | 7/1998 | Kendall | B62D 63/08 280/400 |
| 6,773,025 B1 | * | 8/2004 | Zelm | B62D 63/061 280/40 |
| 6,926,292 B1 | * | 8/2005 | Weeks | B62B 1/26 280/30 |
| 8,272,647 B2 | | 9/2012 | Pendl | |
| 8,496,298 B2 | * | 7/2013 | Martini | B60P 1/04 298/17 T |
| 8,678,329 B1 | * | 3/2014 | Bryant, Sr. | B62B 5/0083 182/116 |
| 8,936,268 B2 | * | 1/2015 | Craven | B62B 1/008 280/652 |
| 2005/0029776 A1 | * | 2/2005 | Koch | B62D 63/061 280/656 |
| 2007/0126210 A1 | * | 6/2007 | Tai | B60D 1/00 280/656 |
| 2009/0212515 A1 | * | 8/2009 | Oyasaeter | B62D 63/062 280/40 |
| 2014/0306425 A1 | * | 10/2014 | Atkinson | B62D 33/023 280/414.5 |
| 2015/0123361 A1 | * | 5/2015 | Willett | B62B 1/002 280/47.18 |

OTHER PUBLICATIONS

Precision Owner's Manual LDT1003BT Dump Cart, 4 pp. (Nov. 2010).

* cited by examiner

CART WITH FOLDING SUPPORT

BACKGROUND OF THE INVENTION

1. Field of the Invention

The present invention relates generally to wheeled carts, and more particularly to a cart including an unfolding axle support assembly for rotatably connecting at least one wheel.

2. Description of the Prior Art

Carts, which are generally used for transporting articles, can be towed behind various types of vehicles. A cart is often packaged for shipment to a distributor or end consumer. The cart is often shipped in a disassembled state to more readily fit within standard shipping boxes. The cart is then assembled upon arrival. However, assembling the cart may include installing a large number of fasteners to attach various components resulting in an undesirably long assembly time.

SUMMARY OF THE INVENTION

In one embodiment, a cart may comprise a body, an axle, a forward support, and a rear support. Each of the supports may include a hinged end and a free end, and each of the supports may be hingedly mounted to the body at their respective hinged end. The hinged end of each support may define a respective axis and each support may hinge about its respective axis. Each of the supports may include a plurality of members to receive the axle therethough and connect the forward support to the rear support. The axle may be configured to rotatably connect at least one wheel, and the axle may include an axis of rotation. In some embodiments, the axis of rotation may by parallel to each of the forward support axis and the rear support axis. This configuration may be particularly useful for many reasons. For example, this configuration may reduce the number of fasteners that must be installed during assembly and therefore may reduce assembly time.

The cart may further include a tow bar configured to connect to the axle of the cart. The tow bar may comprise a hitch to attach the cart to a vehicle to transport the cart. The cart may further comprise a tow bar support member attached to the body of the cart. The tow bar support member may be selectively connected to the tow bar. The cart may further comprise a tailgate, and the tailgate may by selectively attachable to the cart. The body of the cart may include tailgate receiving slots for receiving the tailgate therein.

In another embodiment, a method of assembling the cart may include releasing each of the forward support and the rear support from a storage configuration in which the supports are arranged flat against the base of the cart. The user may position the forward support and the rear support to connect the free end of the forward support to the free end of the rear support. The user may insert the axle into the free ends of the supports to connect the free ends of the supports. The user may connect a first wheel to the axle. In some embodiments, the user may connect a second wheel to the axle.

The user may connect a tow bar to the cart. The tow bar may include a hole disposed therein to receive the axle. The cart may further comprise a tow bar support member attached to the body of the cart. The user may connect the tow bar to the tow bar support using a latch.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
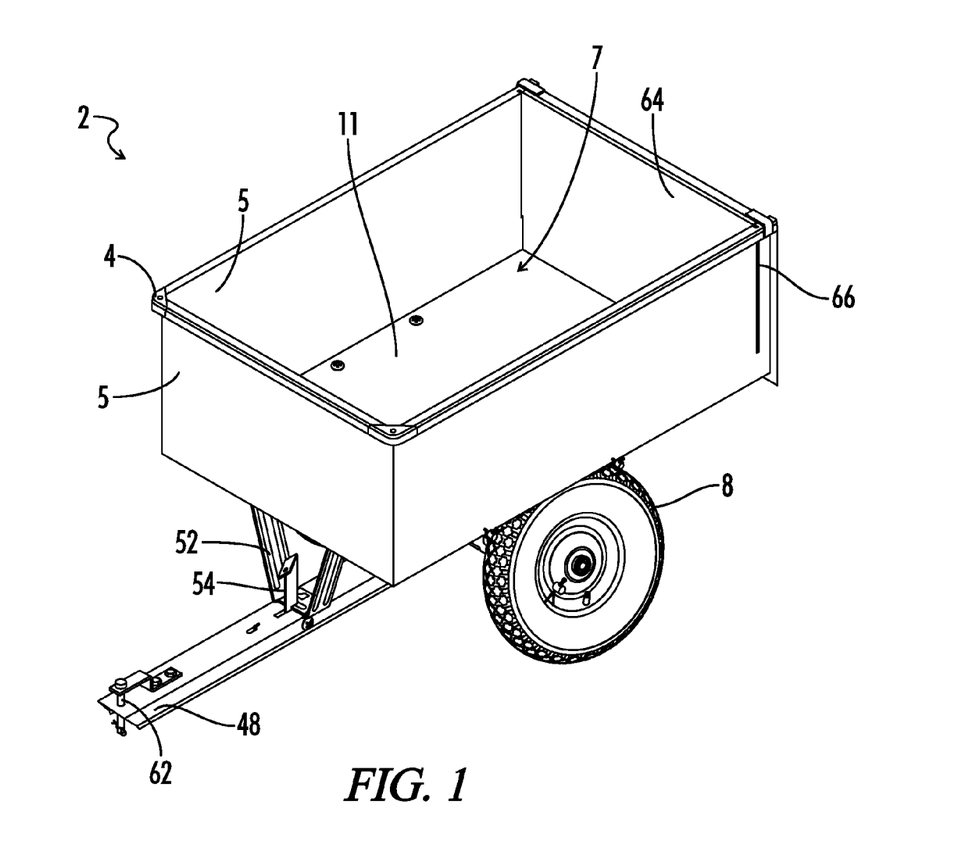
FIG. 1 is a perspective view of an assembled cart.

A perspective view of a cart 2 is shown in FIG. 1. As shown in FIGS. 1 to 4, the cart 2 may comprise a body 4. As shown in FIG. 1, the body 4 may be a container 4 having sidewalls 5 and a bottom 11. The sidewalls 5 may define a cavity 7 for receiving articles to transport (not shown). However, the body 4 is not limited to the shape shown. The body 4 may be any suitable shape for transporting articles. For example, the body may be a platform. The body 4 may be comprised of flat rectangular members as shown, or the body 4 may include a frame or mesh grid comprised of elongated members similar to a shopping cart. The body may be any suitable dimensions. In some embodiments the body may be from 3 feet to 7 feet long, 2 feet to 5 feet wide, and 1 foot to 4 feet deep.

Figure 2:
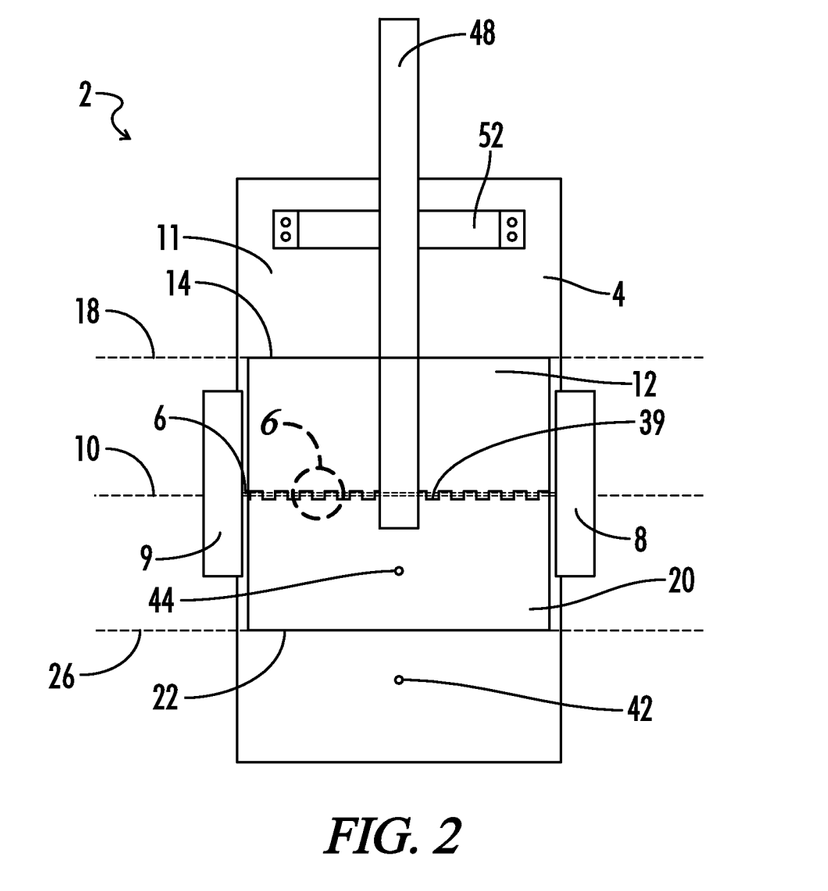
FIG. 2 is a bottom view of the cart of FIG. 1.
Figure 3:
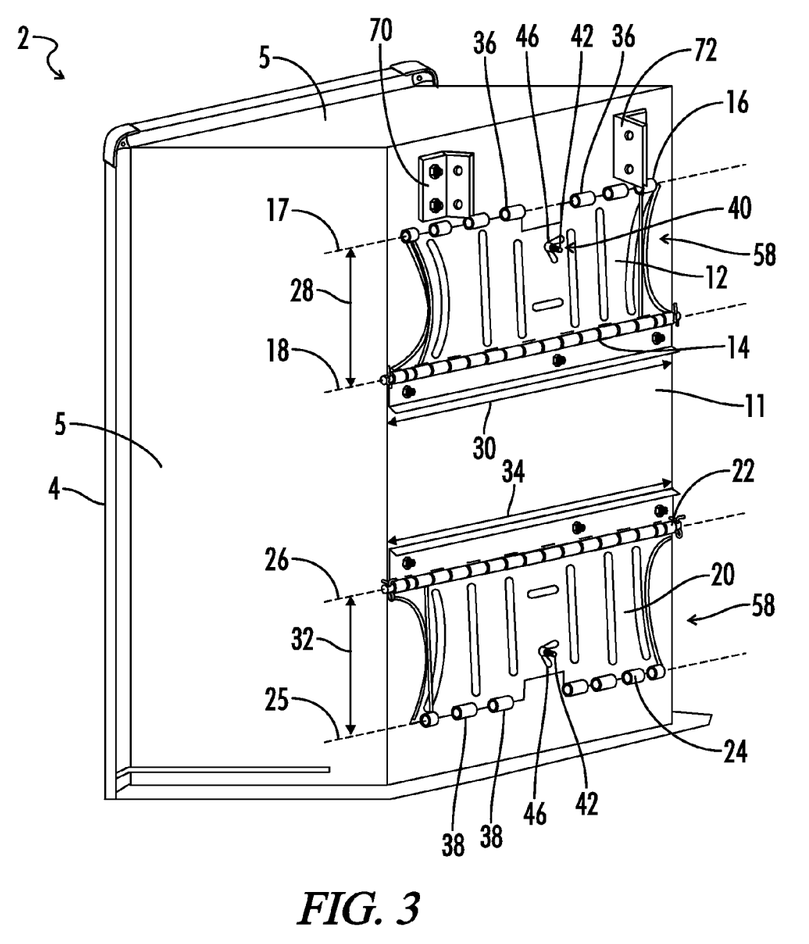
FIG. 3 is a perspective view of the cart of FIG. 1 shown in an unassembled state and without the wheels, axle, tow bar, and tow bar support member.
Figure 4:
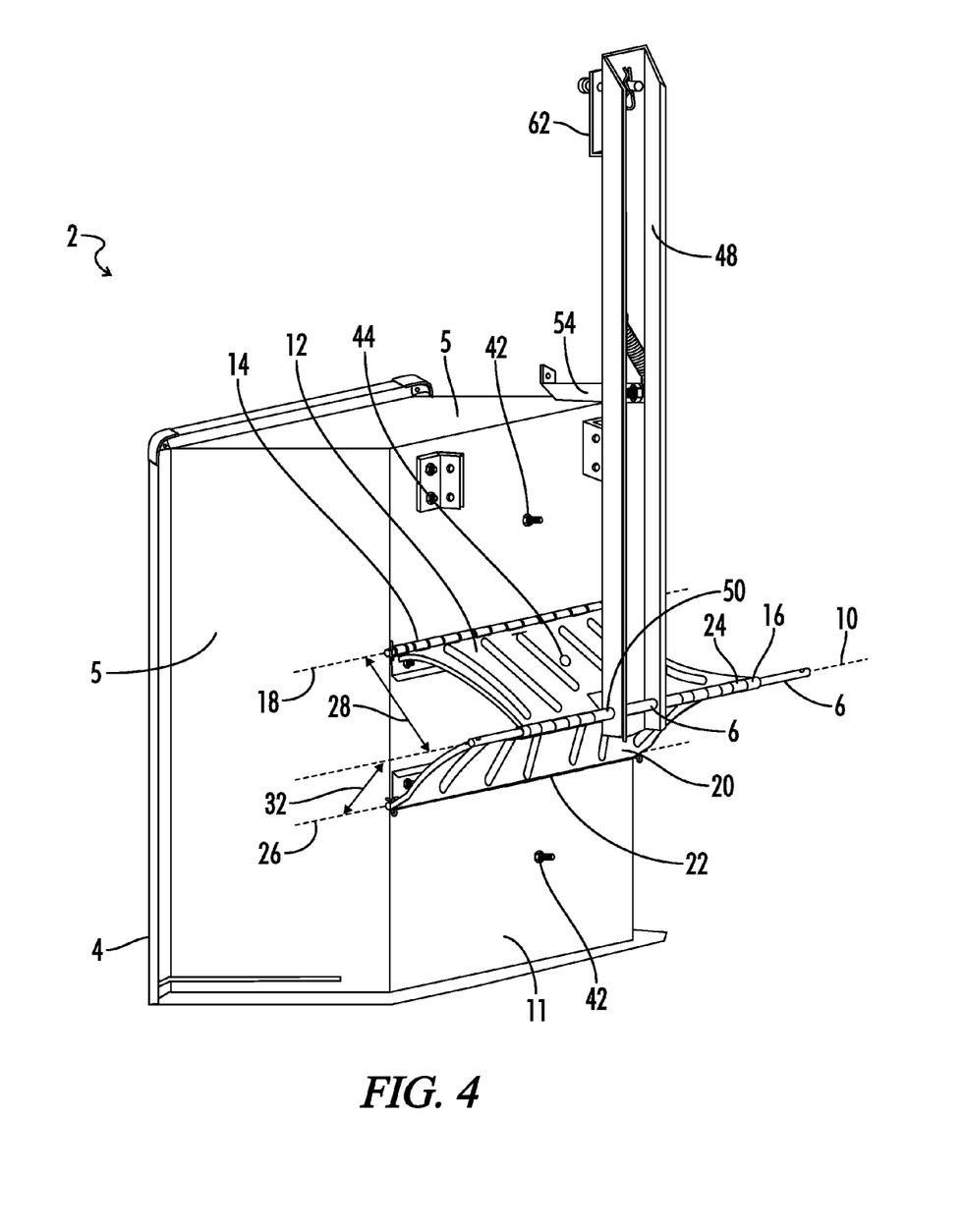
FIG. 4 is a perspective view of the cart of FIG. 1 shown in a partially assembled state shown without the tow bar support member and wheels.

As shown in FIGS. 2 and 4, the cart 2 may further comprise an axle 6, and at least one wheel 8. In the embodiment shown two wheels 8 and 9 are attached to the axle 6. The axle 6 may include an axis of rotation 10. As shown in FIG. 3, the cart may further comprise a forward support 12, and the forward support 12 may include a forward support hinged end 14 and a forward support free end 16. The forward support 12 may be hingedly connected to the body 4 at the forward support hinged end 14, and the forward support hinged end 14 may include a forward support axis 18. The forward support 12 may be configured to pivot about the forward support axis 18.

The cart may further comprise a rear support 20, and the rear support 20 may include a rear support hinged end 22, and a rear support free end 24. The rear support 20 may be hingedly connected to the body 4 at the rear support hinged end 22, and the rear support hinged end 22 may include a rear support axis 26. The rear support 20 may be configured to pivot about the rear support axis 26.

As shown in FIG. 4, the forward support free end 16 may be configured to be selectively connected to the rear support 20 at the rear support free end 24 by the axle 6 to rotatably support the wheels 8 and 9. The forward support 12 and the rear support 20 may create a rigid A-frame structure when connected. The axis of rotation 10 of the axle 6 may be parallel to each of the forward support axis 18 and the rear support axis 26.

Figure 5:
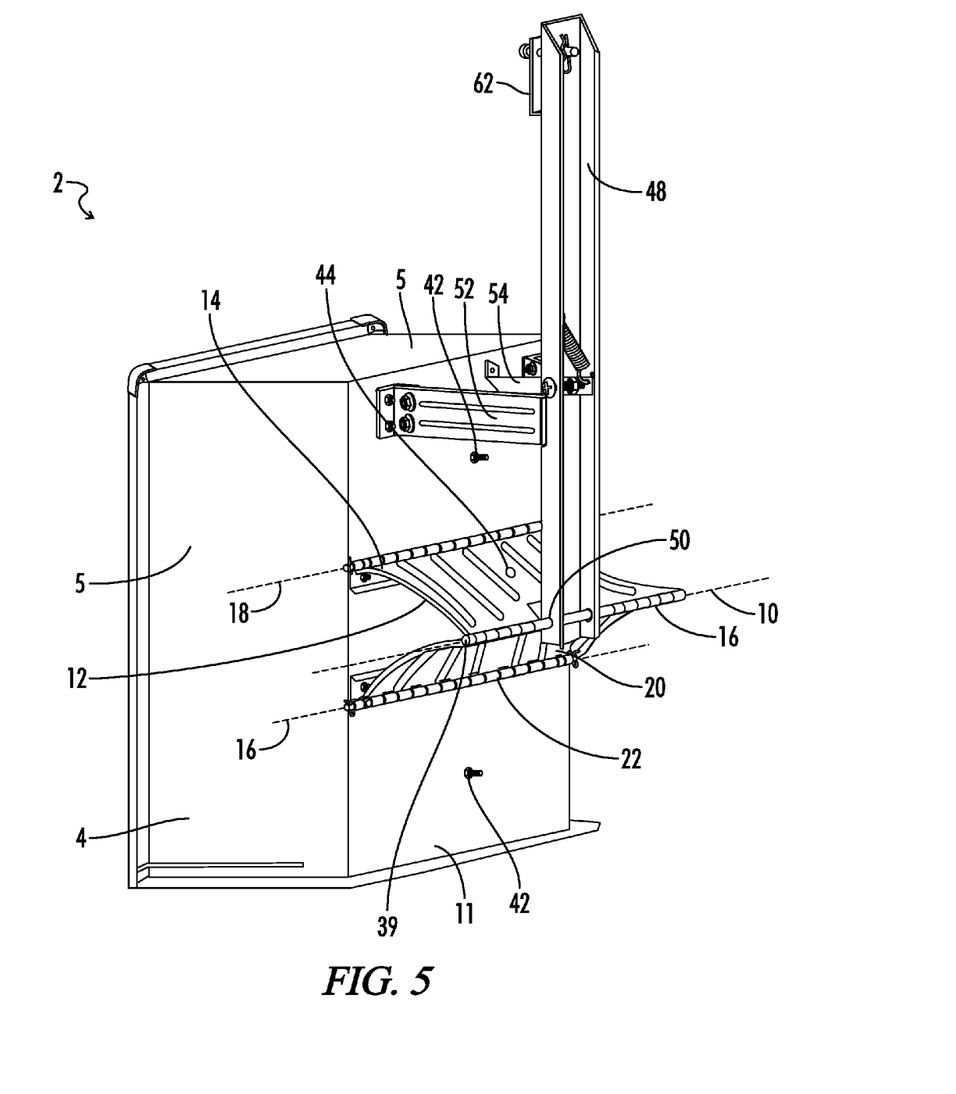
FIG. 5 is a perspective view of the cart of FIG. 1 shown in a partially assembled state without the wheels or axle.
Figure 6:
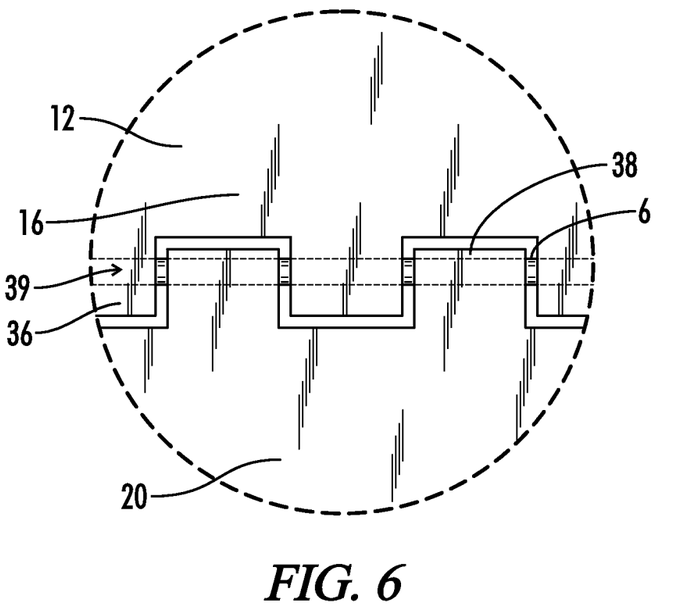
FIG. 6 is an enlarged view of the circled area of the cart of FIG. 2 showing the interdigitated connection between the forward support and the rear support with the axle.

As best shown in FIGS. 3 and 6, in one embodiment, the forward support free end 16 may further include a plurality of forward axle receiving members 36 configured to receive the axle 6 therethrough, and the rear support free end 24 may further include a plurality of rear axle receiving members 38 configured to receive the axle 6 therethrough. As shown in FIG. 3, the forward support free end 16 may include a forward support free end axis 17, and the rear support free end 24 may include a rear support free end axis 25. When the forward support free end 16 is connected to the rear support 20 at the rear support free end 24 by the axle 6, the forward support free end axis 17 may be aligned with the rear support free end axis 25. As shown in FIGS. 5 and 6, the plurality of forward axle receiving members 36 may interdigitate the plurality of rear axle receiving members 38, and the axle may be received through each of the plurality of forward axle receiving members 36 and the plurality of rear axle receiving members 38 to connect the forward support 12 to the rear support 20. This may provide improved structural stability and rigidity between the cart 2 and the axle 6. The axle 6 may be rigidly supported along its received length because of the interdigitated nature of the axle receiving members 36, 38.

Figure 8:
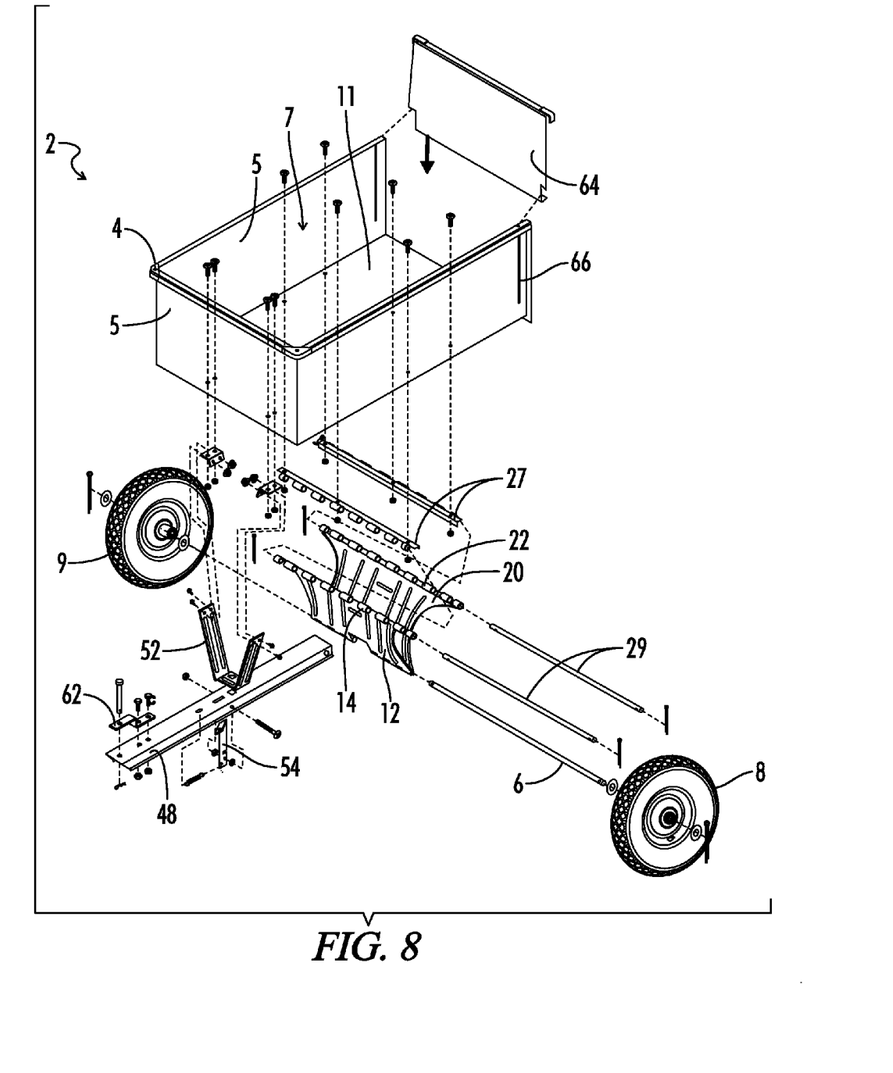
FIG. 8 is an exploded perspective view of the cart of FIG. 1.

Each of the forward support 12 and the rear support 20 may be hingedly connected to the body 4 in any suitable manner known in the art. For example, as shown in FIG. 8, each hinged connection may include a first portion 27 rigidly attached to the body 4 using bolts, rivets, adhesive, welded etc. The first portion may include a plurality of hinge members each defining a hole therein to receive a connecting rod 29 therethrough. Each of the forward support hinged end 14 and the rear support hinged end 22 may include a plurality of hinge members each including a hole defined therein to receive the connecting rod 29. Each of the forward support hinged end 14 and the rear support hinged end 22 may be interdigitated with one of the first portion hinge members 27 to create a hinge joint. In one embodiment, the hinged connection between the forward support 12 and the body 4 may be a piano hinge, and the hinged connection between the rear support 20 and the body 4 may be a piano hinge.

As best seen in FIG. 3, the forward support 12 may further include a forward support length 28 defined as the distance from the forward support hinged end 14 to the forward support free end 16 measured in a plane orthogonal to the forward support axis 18. The forward support 12 may further include a forward hinged width 30 defined as the dimension of the forward support hinged end 14 measured along the forward support axis 18. In one embodiment, the forward hinged width 30 may be longer than the forward support length 28. This arrangement may provide improved structural stability between the at least one wheel 8 and the body 4 of the cart.

The rear support 20 may further include a rear support length 32 defined as the distance from the rear support hinged end 22 to the rear support free end 24 measured in a plane orthogonal to the rear support axis 26. The rear support 20 may further include a rear hinged width 34 defined as the dimension of the rear support hinged end 22 measured along the rear support axis 26. In one embodiment, the rear hinged width 34 may be longer than the rear support length 32. This arrangement may provide improved structural stability between the at least one wheel 8 and the body 4 of the cart. In some embodiments, each of the forward support length 28 and the rear support length 32 may be from 6 inches to 18 inches.

In one embodiment, the axle 6 may be cylindrical and may rotate within the plurality of receiving members 36, 38.

In another embodiment, the axle may have a non-circular cross section e.g. a square or triangular cross section. In this embodiment, each of the plurality of axle receiving members 36, 38 may include a hole therein, and each hole may have a complementary shape to the cross sectional shape of the axle 6 receive the axle 6. In this embodiment, the axle 6 may not rotate, but rather the axle 6 may be rotationally fixed with respect to the axis of rotation 10. In this embodiment, the wheels 8 and 9 may be rotatably connected to the axle 6.

Each of the forward support 12 and the rear support 20 may be any suitable shape not limited to the shape shown in FIGS. 2-4. The shape of the supports 12, 20 may be generally flat and rectangular. In one embodiment, each of the supports 12, 20 may be a frame, and each frame may be comprised of elongated structural members. The supports 12, 20 may be any suitable material including, but not limited to steel, aluminum, plastic etc.

In one embodiment, the forward support 12 may be a first member 12, and the rear support 20 may be a second member 20. The first member 12 and the second member 20 may be relatively oriented in any suitable configuration and not limited to forward and rear respectively.

As shown in FIGS. 3 and 6, the axle receiving members 36, 38 may be tubular appendages 36, 38, and the tubular appendages 36, 38 may interdigitate to define an axle cavity 39. The axle cavity 39 may be configured to receive the axle 6 therethrough. The first member 12 and the second member 20 may be pivotally mounted to the container 4, and each of the first member 12 and the second member 20 may have a respective connected end 14, 22.

As shown in FIGS. 2 and 8, the cart may include two wheels 8 and 9. However, in another embodiment, the cart 2 may include only one wheel. The single wheel may be rotatably connected to the axle 6 in the middle of the axle 6 measured along the axis of rotation 10 of the axle 6. In this embodiment, each of the forward support 12 and the rear support 20 may include a cutaway (not shown) disposed therein to receive the wheel.

In another embodiment, the cart 2 may include one wheel rotatably connected to the supports 12, 20 by the axle 6 in the middle of the axle 6, and two additional wheels (not shown) may be rotatably attached to the body 4 to provide a three-wheeled wheelbarrow type arrangement.

In another embodiment, the cart 2 may include two wheels 8, 9 rotatably mounted to the supports 12, 20 and a third wheel (not shown) rotatably mounted to the body 4 of the cart 2 to provide a three-wheeled wheelbarrow type arrangement.

In another embodiment, the cart 2 may comprise handles (not shown) to allow a user to manually transport the cart 2.

In another embodiment, the cart may include two or more unfolding axle support assemblies as described herein. Each of the unfolding axle support assemblies may include a front support 12 and a rear support 20. Two wheels may be rotatably connected to each of the unfolding axle support assemblies to provide a four wheeled cart.

As shown in FIG. 3, the cart 2 may further comprise a locking mechanism 40 configured to lock the forward support 12 and the rear support 20 in a storage configuration 58. As shown in FIG. 3, the storage configuration 58 may be defined by each of the forward support 12 and the rear support 20 positioned flat against the body 4. The storage configuration 58 may include each of the forward support free end 16 and the rear support free 24 end contacting the body 4. The locking mechanism 40 may include any suitable combination of fasteners to secure the forward support 12 and the rear support 20 in the storage configuration 58. For example, suitable fasteners may include snap fit fasteners, clasps, latches, zipties, tape, etc. The storage configuration 58 may include any suitable configuration to reduce the extension of the forward support 12 and the rear support 20 from the body 4 in a plane orthogonal to the forward support axis 18.

As best shown in FIGS. 3-4, the locking mechanism 40 may include a pair of threaded shafts 42 attached to the body 4 and each of the pair of threaded shafts 42 may extend from the body 4. Each of the forward support 12 and the rear support 20 may include holes 44 defined therein for receiving a respective one of the threaded shafts 42 therethrough. As best shown in FIG. 3, the locking mechanism 40 may further include a pair of fasteners 46 configured to be threadingly received by the pair of threaded shafts 42 to secure each of the forward support 12 and the rear support 20 in the storage configuration 58. The fasteners may be any suitable fasteners including a wing nut, hexagonal nut etc.

As shown in FIG. 5, in one embodiment, the cart 2 may further comprise a tow bar 48, and the tow bar 48 may include a hole 50 defined therein to receive the axle 6. When the forward support free end 16 is connected to the rear support 20 at the rear support free end 24 by the axle 6, the axle 6 may be received in the hole 50 in the tow bar 48 to connect the tow bar 48 to the forward support 12 and the rear support 20. The tow bar 48 may include a hitch 62 and the hitch 62 may be configured to connect the cart 2 to a towing vehicle e.g. tractor or lawnmower to tow the cart 2.

As shown in FIG. 5, the cart 2 may further comprise a tow bar support member 52 attached to the body 4 of the cart 2, and the tow bar support member 52 may be selectively connectable to the tow bar 48. The tow bar support member 52 may be attached to the body 4 using any suitable method including mechanical fasteners such as bolts or rivets. In one embodiment, the tow bar support member 52 may be welded to the body 4.

The tow bar 48 may further include a latch 54, and the latch 54 may be operable to selectively disconnect the tow bar 48 from the tow bar support member 52 so that the cart 4 can tilt rearwardly to dump a load. The latch 54 may be resiliently biased into a closed position to prevent accidental disconnection of the tow bar 48 from the tow bar support member 52.

Figure 7:
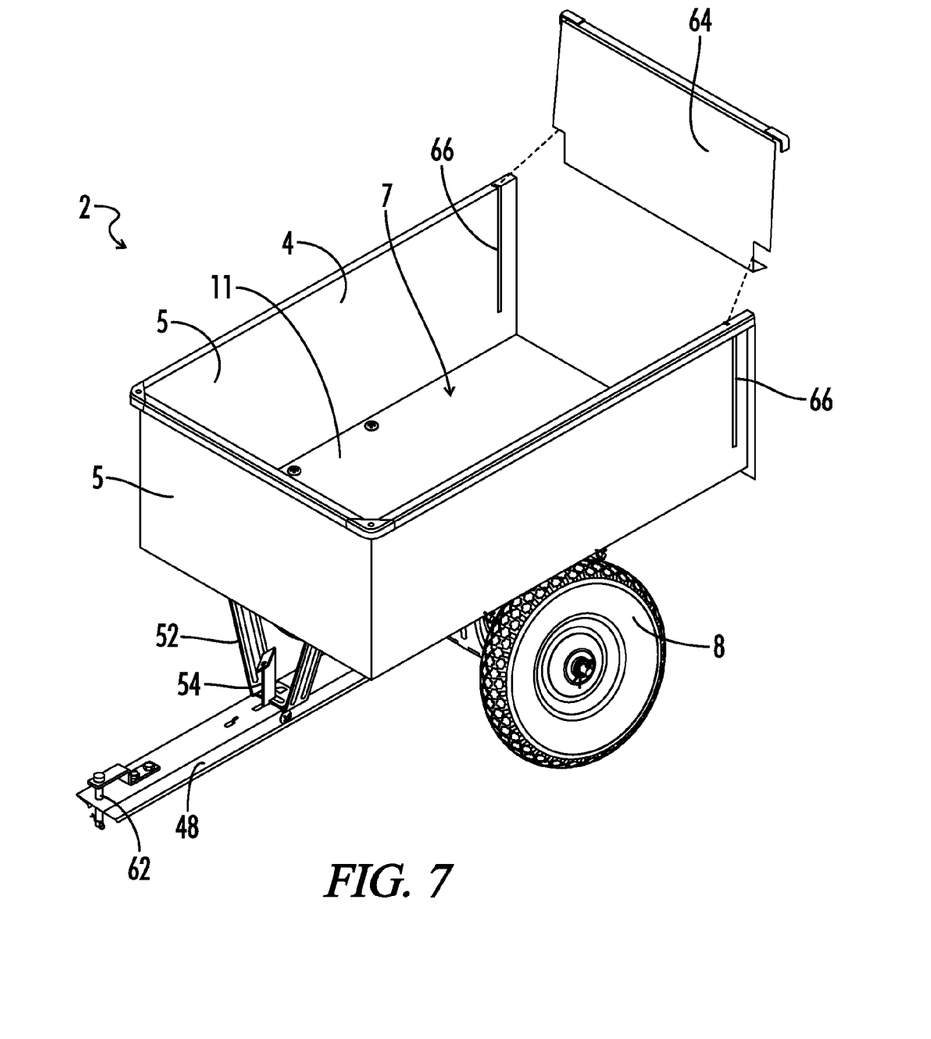
FIG. 7 is a partially exploded perspective view of the cart of FIG. 1 shown in an assembled state.

As shown in FIG. 7, the cart 2 may further comprise a selectively removable tailgate 64. The body 4 of the cart 2 may further include tailgate receiving slots 66 defined therein to receive the tailgate 64.

Methods of Assembly

A method of assembling the cart 2 may comprise positioning each of the forward support 12 and the rear support 20 to align the forward support free end 16 of the forward support 12 with the rear support free end 24 of the rear support 20. As shown in FIG. 4, a user may connect the forward support free end 16 to the rear support free end 24 with the axle 6. The axle may define an axis of rotation 10 parallel to each of the forward support hinged axis 18 and the rear support hinged axis 26. As shown in FIG. 8, the user may connect wheels 8 and 9 to the axle 6.

The positioning of the forward support 12 and the rear support 20 may also include releasing each of the forward support 12 and the rear support 20 from a storage configuration 58. As seen in FIG. 3, the storage configuration 58 may be defined by each of the forward support 12 and the rear support 20 secured to the body 4 of the cart 2 to prevent each of the forward support 12 and the rear support 20 from pivoting about the respective hinged axis 18, 26.

In one embodiment, the user may additionally connect a tow bar 48 to the cart 2, and the tow bar 48 may include a hole 50 disposed therein to receive the axle 6. The axle 6 may be received in the hole 50 in the tow bar 48 to connect the tow bar 48 to the cart 2. As shown in FIG. 5, the user may also attach a tow bar support 52 to the body 4 of the cart 2 and may connect the tow bar support 52 to the tow bar 48. The user may attach the tailgate 64 to the body 4 of the cart 2 by inserting the tailgate 64 into the tailgate receiving slots 66. The cart 2 is shown in assembled state in FIG. 1.

Once the cart is assembled the user may utilize the cart 2 to move articles. The user may load the cart 2 by placing articles to be moved in the cavity 7 defined by the body 4 of the cart 2. The user may then attach the cart to a towing vehicle such as a tractor or lawnmower to move the cart by attaching the hitch 62 to a receiving hitch of the vehicle. The user may then move the cart 2 to another location and disconnect the tow bar 48 from the tow bar support 52 by disconnecting the latch 54. Disconnecting the latch 54 may include actuating the latch 54 against a resilient bias and the tow bar 48 may be resiliently biased to maintain connection between the tow bar 48 and the tow bar support 52. The user may then remove the tailgate 64 by sliding the tailgate 64 out of the tailgate receiving slots 66. The user may then rotate the body 4 of the cart 2 about the wheels 8, 9 to dump the contents of the cart.

The design provided herein allows the cart to be shipped with the cart body and the forward support 12 and rear support 20 in their storage configuration as generally shown in FIG. 3. It is noted that support brackets 70 and 72 for the tow bar support member 52 are also already in place bolted to the bottom 11 of the body 4.

In this arrangement, all of the through bolts through the bottom 11 of the cart body 4 are already in place when the customer receives the unassembled cart. This greatly reduces the assembly effort required by the customer because it is not necessary for the customer to place and attach through bolts through the bottom 11 of the cart 4, a task which is time consuming and may require two persons.

Thus, in order to convert the cart from the storage configuration seen in FIG. 3 to an operating configuration, it is only necessary for the user to undo the wing nuts 46, pivot the forward and rearward supports 12 and 20 together, and slide the axle 6 into place in the cavity 39 defined by the free ends of the forward and rearward support.

This assembly process as shown in the sequential series of FIGS. 3, 4 and 5 may be performed with the cart body 4 standing on its tail end as shown in FIG. 3.

As seen in FIG. 4, the forward and rearward supports 12 and 20 are pivoted together and then assembled with the tow bar 48 by placing the axle 6 through the aligned supports and tow bar. Then, as seen in FIG. 5, the user may install the tow bar support 52. Subsequently, the wheels 8 and 9 are attached to axle 6 and the cart is in a usable state.

As compared to prior art designs wherein the user had to bolt the forward and rearward supports to the bottom 11 of the cart 4 with through bolts through the bottom 11, the assembly time is greatly reduced, as is the complexity of the assembly procedure.

Thus it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A cart comprising:
a body;
an axle having an axis of rotation;
at least one wheel;
a forward support including a forward support hinged end, and a forward support free end, the forward support hingedly connected to the body at the forward support hinged end, the forward support hinged end including a forward support axis, the forward support configured to pivot about the forward support axis;
a rear support including a rear support hinged end, and a rear support free end, the rear support hingedly connected to the body at the rear support hinged end, the rear support hinged end including a rear support axis, the rear support configured to pivot about the rear support axis; and wherein
the forward support and rear support are configured to be positioned flat against the body in a storage configuration;
the forward support free end is configured to be selectively connected to the rear support at the rear support free end by the axle to rotatably support the wheel; and
the axis of rotation of the axle is parallel to each of the forward support axis and the rear support axis.

2. The cart of claim 1, wherein the forward support further includes:
a forward support length defined as the distance from the forward support hinged end to the forward support free end measured in a plane orthogonal to the forward support axis; and
a forward hinged width defined as the dimension of the forward support hinged end measured along the forward support axis, and wherein;
the forward hinged width is longer than the forward support length.

3. The cart of claim 1, wherein the rear support further includes:
a rear support length defined as the distance from the rear support hinged end to the rear support free end measured in a plane orthogonal to the rear support axis; and
a rear hinged width defined as the dimension of the rear hinged end measured along the rear support axis, and wherein;
the rear hinged width is longer than the rear support length.

4. The cart of claim 1, wherein:
the hinged connection between the forward support and the body is a piano hinge; and
the hinged connection between the rear support and the body is a piano hinge.

5. The cart of claim 1 further comprising a lock configured to lock the forward support and the rear support in the storage configuration.

6. The cart of claim 1 further comprising a tow bar including a hole defined in the tow bar to receive the axle.

7. The cart of claim 6 further comprising a tow bar support member attached to the body of the cart, the tow bar support member selectively connectable to the tow bar.

8. The cart of claim 7, wherein the tow bar further includes a latch, the latch operable to selectively disconnect the tow bar from the tow bar support member.

9. A cart comprising:
a body;
an axle having an axis of rotation;
at least one wheel;
a forward support including a forward support hinged end, and a forward support free end including a plurality of forward axle receiving members configured to receive the axle therethrough, the forward support hingedly connected to the body at the forward support hinged end, the forward support hinged end including a forward support axis, the forward support configured to pivot about the forward support axis;
a rear support including a rear support hinged end, and a rear support free end including a plurality of rear axle receiving members configured to receive the axle therethrough, the rear support hingedly connected to the body at the rear support hinged end, the rear support hinged end including a rear support axis, the rear support configured to pivot about the rear support axis; and wherein
the forward support free end is configured to be selectively connected to the rear support at the rear support free end by the axle to rotatably support the wheel;
when the forward support free end is connected to the rear support at the rear support free end by the axle, the plurality of forward axle receiving members interdigitates the plurality of rear axle receiving members, and the axle is received through each of the plurality of forward axle receiving members and the plurality of rear axle receiving members to connect the forward support to the rear support; and
the axis of rotation of the axle is parallel to each of the forward support axis and the rear support axis.

10. A cart comprising:
a body;
an axle having an axis of rotation;
at least one wheel;
a forward support including a forward support hinged end, and a forward support free end, the forward support hingedly connected to the body at the forward support hinged end, the forward support hinged end including a forward support axis, the forward support configured to pivot about the forward support axis;
a rear support including a rear support hinged end, and a rear support free end, the rear support hingedly connected to the body at the rear support hinged end, the rear support hinged end including a rear support axis, the rear support configured to pivot about the rear support axis; and wherein
each of the forward support free end and the rear support free end contact the body in a storage configuration;
the forward support free end is configured to be selectively connected to the rear support at the rear support free end by the axle to rotatably support the wheel; and
the axis of rotation of the axle is parallel to each of the forward support axis and the rear support axis.

11. A cart comprising:
a body;
an axle having an axis of rotation;
at least one wheel;
a forward support including a forward support hinged end, a forward support free end, and a forward support hole defined in the forward support for receiving a respective one of a pair of threaded shafts therethrough, the forward support hingedly connected to the body at the forward support hinged end, the forward support hinged end including a forward support axis, the forward support configured to pivot about the forward support axis;

a rear support including a rear support hinged end, a rear support free end, and a rear support hole defined in the rear support for receiving a respective one of the pair of threaded shafts therethrough, the rear support hingedly connected to the body at the rear support hinged end, the rear support hinged end including a rear support axis, the rear support configured to pivot about the rear support axis; wherein the forward support free end is configured to be selectively connected to the rear support at the rear support free end by the axle to rotatably support the wheel; and the axis of rotation of the axle is parallel to each of the forward support axis and the rear support axis; and a lock configured to lock the forward support and the rear support in a storage configuration, the lock includes the pair of threaded shafts attached to the body, each of the pair of threaded shafts extending from the body, and a pair of fasteners configured to be threadingly received by the pair of threaded shafts to secure each of the forward support and the rear support in the storage configuration.

12. A cart comprising:
an axle;
a container;
a first member pivotally mounted to the container and including a first plurality of tubular appendages; and
a second member pivotally mounted to the container and including a second plurality of tubular appendages, each of the first member and the second member configured to pivot to align the first plurality of tubular appendages and the second plurality of tubular appendages to define an axle cavity to receive the axle therethrough, and when the first plurality of tubular appendages are aligned with the second plurality of tubular appendages, the first plurality of tubular appendages interdigitates the second plurality of tubular appendages.

13. The cart of claim 12, wherein:
the first member includes a first member connected end, the first member connected end including a first member axis, the first member configured to pivot about the first member axis; and
the second member includes a second member connected end, the second member connected end including a second member axis, the second member configured to pivot about the second member axis, and the second member axis is parallel to the first member axis.

14. The cart of claim 13, wherein when the axle is received within the axle cavity, the axle includes an axis of rotation, and the axis of rotation is parallel to each of the first member axis and the second member axis.

15. The cart of claim 13, wherein:
the first member connected end includes a first member connected end width, the first member connected end width defined as the dimension of the first member connected end along the first member axis;

the second member connected end includes a second member connected end width, the second member connected end width defined as the dimension of the second member connected end along the second member axis; and the axle includes an axle spacing distance, the axle spacing distance defined as the shortest distance from the axis of rotation of the axle to the container, and the axle spacing distance is smaller than at least one of the first member connected end width and the second member connected end width.

16. A method of assembling a cart, the method comprising:
(a) providing a forward support and a rear support hingedly connected to a body of the cart, the forward support including a forward support hinged axis, and the rear support including a rear support hinged axis;
(b) positioning each of the forward support and the rear support to align a plurality of forward support tubular appendages on a forward support free end of the forward support with a plurality of rear support tubular appendages on a rear support free end of the rear support;
(c) connecting the forward support free end to the rear support free end with an axle, each of the forward support free end and the rear support free end configured to receive the axle therein, the axle defining an axis of rotation, and wherein the axis of rotation is parallel to each of the forward support hinged axis and the rear support hinged axis; and
(d) connecting at least one wheel to the axle.

17. The method of claim 16, wherein step (b) further comprises releasing each of the forward support and the rear support from a storage configuration, the storage configuration defined wherein each of the forward support and the rear support are secured to the body of the cart to prevent each of the forward support and the rear support from pivoting about the respective hinged axis.

18. The method of claim 16, wherein the at least one wheel of step (d) includes a first wheel and a second wheel.

19. The method of claim 16 wherein step (c) further includes connecting a tow bar to the cart, the tow bar including a hole disposed therein to receive the axle, the axle received in the hole in the tow bar to connect the tow bar to the cart.

20. The method of claim 19, wherein step (c) further includes attaching a tow bar support to the body of the cart and connecting the tow bar support to the tow bar.

21. The method of claim 19, further comprising:
(e) disconnecting the tow bar from the tow bar support.

22. The method of claim 21, wherein step (e) further comprises actuating a latch against a resilient bias, the latch resiliently biased to maintain connection between the tow bar and the tow bar support.

* * * * *